March 10, 1959 B. ADAMSON ET AL 2,876,549
MEASURING WHEEL
Filed Jan. 14, 1957
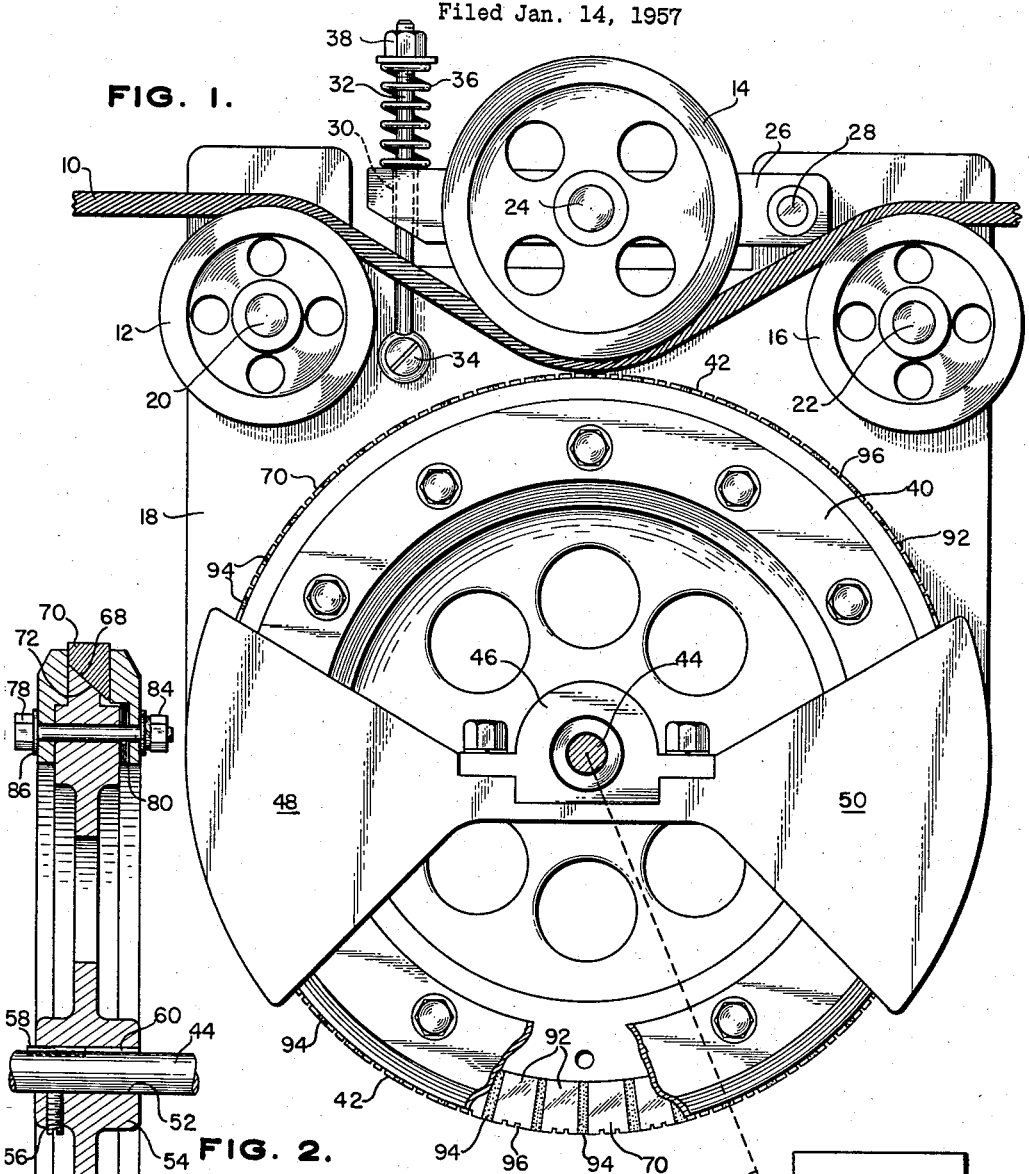
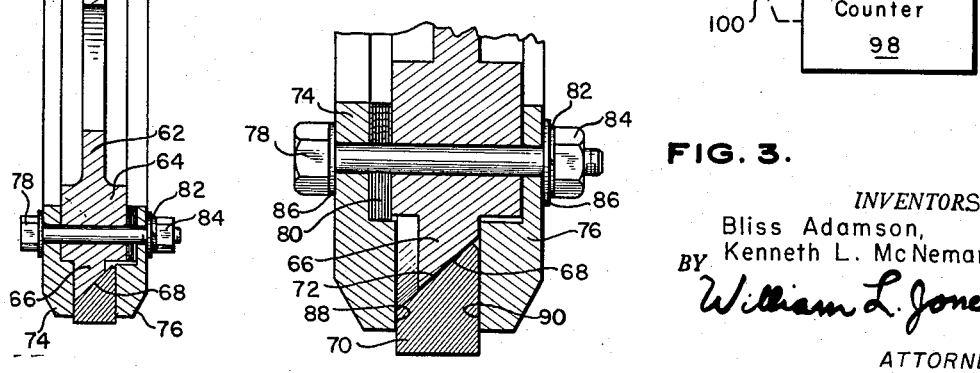
INVENTORS.
Bliss Adamson,
Kenneth L. McNemar,
BY William L. Jones
ATTORNEY.

United States Patent Office 2,876,549
Patented Mar. 10, 1959

2,876,549

MEASURING WHEEL

Bliss Adamson and Kenneth L. McNemar, Houston, Tex., assignors, by mesne assignments, to Welex, Inc., a corporation of Delaware Application January 14, 1957, Serial No. 633,987

7 Claims. (Cl. 33—129)

This invention relates generally to measuring wheels for use in making linear measurements along surfaces moving relative thereto, such as in measuring lengths of moving line or cable or the like during the unreeling or other extension thereof. More particularly, the invention relates to an adjustable measuring wheel which may be calibrated to meet varying conditions of use.

One application wherein the invention provides particular advantages is in connection with the performance of certain well operations wherein it is desired to use a measuring wheel to measure the length of a line or cable during the unreeling and lowering thereof into the bore of an oil or gas well. It is well known that inaccurate measurements may in these instances result due to very minor variations in the measuring wheel circumference as well as to the stretching of the line or cable occurring at points therealong which have already passed by the measuring wheel located at the surface.

The amount of stretching of the line or cable likely to occur in any particular well operation depends upon various factors, among which are the size, type, age, and condition of the line or cable being measured and the depth to which it is lowered into the well. The influence of all of these factors cannot ordinarily be accurately predicted. However, experience has shown that sufficiently accurate measurements for most purposes can be made if the measuring equipment includes suitable means permitting ready calibration thereof at convenient times. For example, it is desirable to calibrate the equipment upon replacing the line or cable used therewith and to recalibrate at regular intervals during the life of the line or cable. Also, the equipment may be recalibrated prior to making any measurement under conditions so unusual that the most recent previous calibration is likely to afford insufficient correction for error.

While any of various arrangements might be employed whereby measuring equipment of the type described may be calibrated for use under varying conditions, it is highly desirable in oil field and similar applications for the arrangement used to involve relatively simple adjustments which can be readily made in the field. Thus, an operator should be able to calibrate the equipment on the basis of his experienced judgment together perhaps with recommendations derived from laboratory tests which have previously been conducted with respect to the particular size and type of line or cable to be measured.

One practice which could be followed would be to maintain with each unit of measuring equipment an adequate supply of measuring wheels of appropriate fixed sizes corresponding to the varying conditions of use most likely to be encountered. Such a practice has obvious disadvantages which can be overcome by employing a satisfactory single measuring wheel which is readily adjustable in the field to any of a variety of uniform sizes.

It is a general object of the present invention to provide an improved measuring wheel for use in making linear measurements along surfaces moving relative thereto.

It is another object of the invention to provide an improved measuring wheel of the type described having provision permitting adjustment or calibration thereof to met varying conditions of use.

It is another object of the invention to provide an improved measuring wheel of adjustable size for use in measuring lengths of line or cable or the like during the movement thereof into and through the bore of an oil or gas well or the like.

It is another object of the invention to provide an improved measuring wheel of the type described having provision permitting accurate adjustment thereof to any of various uniform sizes.

It is a further object of the invention to provide an improved measuring wheel of uniformly adjustable size for use in measuring lengths of moving line or cable or the like during the unreeling or other extension thereof under conditions tending to increase or otherwise change the length of the line or cable or otherwise tending to adversely affect the accuracy of the measurement.

The present invention involves the concept of a measuring wheel including a rigid circular body on which is mounted a resilient and expansible annular shoe or tire having a peripheral surface for contacting surfaces to be measured. The shoe or tire is disposed between abutment means on the rigid body and abutment means which is moutned for relative lateral movement with respect to such body to control the radial expansion of such shoe or tire and thereby control the length of its peripheral contact surface.

The invention involves the further concept of specially constructing and arranging the parts of the wheel so that substantially uniform radial expansion of the shoe or tire may be effected and so that any of a variety of predetermined wheel sizes may be selected.

The foregoing and other objects and advantages of the invention will become more apparent from the following description of one embodiment thereof when read in connection with the accompanying drawing in which similar reference characters designate similar parts and wherein:

Figure 1 is mainly a side elevational, partly cut-away view of an assembly of apparatus including a measuring wheel constructed in accordance with the invention;

Figure 2 is a front sectional view of the measuring wheel of Figure 1 taken through the axis of the wheel, which is shown with its parts in the positions occupied by them when the wheel is of minimum size; and Figure 3 is an enlarged fragmentary view similar to that of Figure 2 but with the wheel being shown with its parts in the position occupied by them when the wheel is of maximum size.

Referring to the drawing in detail, the invention is there illustrated and is hereinafter described, by way of example, as being applied to an arrangement suited for use in connection with the measurement of a line or cable 10 such as during the unreeling and lowering thereof into the bore of an oil or gas well.

Referring first to Figure 1, the cable 10 is shown threaded through a series of pulleys or sheaves 12, 14, and 16 which guide the cable 10 during the movement thereof. It is understood that the cable 10 is being unreeled or extended from a source such as a line or cable reel assembly (not shown) into a nearby well (also not shown).

Each of the sheaves 12, 14, and 16 is rotatably mounted on a support or frame 18 which in actual practice may be provided on a truck or other mobile unit parked at or near the well site. As illustrated, the sheaves 12 and 16 are of similar size or diameter and are mounted, respectively, on spaced apart axles 20 and 22 which extend outwardly from the upper portion of the frame 18.

The sheave 14 is disposed between and is of somewhat larger diameter than the sheaves 12 and 16.

As illustrated, the larger sheave 14 is mounted on an axle 24 carried by a transverse arm 26 which is pivotally connected at one end to the frame 18, such as by means of screwbolt 28. Near its opposite or free end, the arm 26 is provided with a vertically extending opening 30. An upstanding rod 32 is pivotally connected at its lower end to the frame 18, such as by means of screwbolt 34, and is arranged so as to extend through and a suitable distance above the opening 30 in the arm 26. A compression-type spring 36 encircles the portion of the rod 32 disposed above the arm 26 and is secured thereon by a threaded nut 38, which thus provides an upper abutment engaging the upper end of the spring 36. The lower end of the spring 36 is shown resting on the arm 26. The arrangement is such that the arm 26, together with the sheave 14 mounted thereon, is biased or forced in a downwardly direction by the action of the spring 36. The amount of this downwardly acting force may be controlled by turning the nut 38 to adjust the tension in the spring 36.

As previously indicated, the sheaves 12, 14, and 16 provide line or cable guiding means for facilitating the movement of the cable 10. Due to the arm 26 being biased downwardly, as aforesaid, means is also provided for holding the cable 10 in close contact with a measuring wheel of the type to which the present invention relates.

Thus, a measuring wheel 40 in accordance with the invention is shown rotatably mounted on the frame 18 directly below the sheave 14 carried by the arm 26. The cable 10 is shown extending along the peripheral grooves of the sheaves 12, 14, and 16, passing first over the small sheave 12, then under the larger sheave 14 and thence over the small sheave 16. As illustrated, the measuring wheel 40 has a substantially circular peripheral surface 42 against which the cable 10 is continuously pressed by the sheave 14 due to the action of the spring 34, as hereinbefore described.

As shown best in Figures 1 and 2 together, the measuring wheel 40 is fixedly mounted on an axle 44 which in turn is rotatably mounted on the frame 18. In Figure 1 an end of the axle 44 is shown extending through a housing 46 which is supported by a pair of outwardly and transversely extending support members 48 and 50 forming part of the frame 18. The housing 46 preferably contains bearings or the like on which the axle 44 is mounted. It is understood that the other end of the axle 44 will ordinarily extend through and be rotatably mounted on bearings in a similar housing (not shown) provided on the opposite side of the wheel 40.

In Figure 2 the axle 44 is shown extending through an axial opening 52 provided in a central enlarged portion or hub 54 of the wheel 40. To support the wheel 40 in place, a set screw 56 is shown extending in a generally radial direction inwardly through the hub 54 and into tight engagement with the axle 44. Additional support against relative rotational movement between the wheel 40 and its axle 44 is shown provided by a spline or key 58 which is secured to the axle 44 and extends longitudinally thereof through a groove or keyway 60 provided therefor in the hub 54.

As also shown best in Figures 1 and 2 together, the measuring wheel 40 includes a rigid circular body 62 of which the hub 54 is the axial portion. A perforated, relatively thin portion of the body 62 extends radially outward from the hub 54 to an enlarged or thick annular portion 64. Extending radially beyond such thick portion 64 is a somewhat thinner annular portion 66 having an inclined or tapered surface 68 on one side thereof.

It will be noted in Figure 2 that the tapered surface 68 is shown extending laterally inward and radially outward from at or near the junction of the portions 64 and 66 on one side of the body 62 and terminating a suitable distance beyond the junction of the portions 64 and 66 on the opposite side of the body 62.

The measuring wheel 40 also includes a resilient and expansible annular shoe or tire 70 having an inclined or tapered inner surface 72 which is a companion surface to the tapered surface 68 on the body 62. The tire 70 is shown mounted on the body 62 between spaced-apart annular side plates 74 and 76 which are at times movable laterally with respect to the body 62, as will appear more fully hereinafter.

The side plates 74 and 76 are releasably secured to the body 62, preferably at each of a multiplicity of angularly spaced points distributed generally thereabout, such as about the enlarged or thick portion 64. To this end, a number of screwbolts 78 are shown extending through openings suitably provided therefor in the side plates 74 and 76 and in the thick portion 64 of the body 62.

Each screwbolt 78 is of sufficient length to permit spacers or shims to be mounted thereon between the body 62 and the side plates 74 and 76. In the arrangement shown, shimstock in the form of a set of spacer-type washers 80 is used on each screwbolt 78. In Figure 2 all of the shims or washers 80 of each set are shown mounted on one side of the body 62 between the thick portion 64 thereof and the adjacent side plate 76. In Figure 3 all of each set of shimstock are shown mounted on the opposite side of the body 62 between the thick portion 64 and the other side plate 74. In actual practice some, usually a definite number, of the shims or washers 80 of each set may be disposed on one side and the remainder on the opposite side of the body 62, as will appear more fully hereinafter.

In order to securely but releasably fasten together the side plates 74 and 76, the body 62 and the interposed shims or washers 80, a lock-type washer 82 and a threaded nut 84 are shown tightened onto the threaded end of each screwbolt 78. Ordinary washers 86 are shown encircling the opposite end portions of each screwbolt 78 in conventional arrangement.

It will be noted that both of the side plates 74 and 76 are shown extending radially outward beyond the enlarged or thick portion 64 of the body 62 and that the outer extension of each plate is shown flanged inwardly to provide a pair of flat, spaced-apart surfaces 88 and 90 between which the annular shoe or tire 70 is closely fitted. The arrangement is such that the spacing between the inner surface 88, which is on the side plate 74, and the inner surface 90, which is on the side plate 76, does not change upon the same number of shims or washers 80 of each set being transposed from one side of the body 62 to the opposite side thereof (see Figures 2 and 3).

As shown best in the cut-away portion of Figure 1, the annular shoe or tire 70 includes a multiplicity of segmental sections 92 which are made of hard metal, such as strengthened steel, or other suitable material. The sections 92 are angularly spaced in a circular arrangement and are bonded or otherwise connected together by a resilient and expansible material 94, such as by a natural or artificial rubber or rubber-like material. The arrangement is such that the sections 92 and the interposed material 94 are united so as to form a radially expansible and contractible ring-like member, the outer surface of which is the peripheral surface 42 of the measuring wheel 40.

If desired, the surface 42 of the shoe or tire 70 may be provided with a multiplicity of spaced grooves 96 each of which extends transversely of one of the metal sections 92. These grooves 96 together with the spaces between adjacent sections 92 facilitate maintaining frictional contact between the wheel 40 and the moving line or cable 10.

In order that a record or indication of the length of line or cable 10 passing by the measuring wheel 40 may be obtained, a rotation counter 98 is schematically shown in Figure 1, the counter 98 being coupled to the axle 44 of the wheel 40 by suitable means designated by a broken line 100. The counter 98 and coupling means 100 may each be of well known and conventional design.

If desired, the counter 98 may be selected to provide a continuous indication and make a record of the movement of the line or cable 10 through the bore of the well. For example, the counter 98 may be designed or adjusted to read zero when the line or cable 10, or a tool or instrument suspended thereon, is just beginning to enter the well during the unreeling and lowering thereof. Thereafter the counter 98 may record and continuously indicate in convenient units of length, such as feet and inches, the depth to which the line or cable 10 extends into the well. To this end, the counter 98 may add feet or inches to its record as the wheel 40 rotates in a direction (for example, clockwise) corresponding to downward movement or descent of the line or cable 10 into the well and may subtract feet or inches as the wheel 40 rotates in the opposite (for example, counterclockwise) direction during any upward movement of the line or cable 10 in the well.

When desired, the measuring wheel 40 may be calibrated or adjusted by transposing one or more of the shims or washers 80 of each set thereof from a position adjacent one side to a position adjacent the opposite side of the enlarged portion 64 of the body 62. To this end the wheel 40 may be readily disassembled by loosening each of the nuts 84 and removing the screwbolts 78. Then the wheel 40 is reassembled with the desired number of shims or washers 80 of each set thereof transposed to the other side of the body 62.

If desired, the calibration may be accomplished by first loosening all of the nuts 84 to some extent and then removing each screwbolt 78 in turn and rearranging the shims or washers 80 thereon as desired. In this way the complete calibration procedure may be conducted while the wheel 40 remains mounted on the frame or support 18.

In any event, all of the nuts 84 should be fully tightened upon completion of the calibration, thereby assuring that the desired expansion of the shoe or tire 70 is obtained.

In this connection it will be noted that the shoe or tire 70 is in effect disposed between a stationary abutment means provided by the tapered surface 68 on the body 62 and a movable abutment means provided by the surface 90 on the side plate 76. The arrangement is such that the surface 90 on the side plate 76 moves closer to the surface 68 on the body 62 upon the nuts 84 being tightened after one or more of the shims or washers 80 of each set have been transposed from positions between the body 62 and the side plate 76 (see Figure 2) to positions between the body 62 and the opposite side plate 74 (see Figure 3).

The shoe or tire 70 is mounted so that this movement of the surface 90 on the side plate 76 toward the tapered surface 68 on the body 62 applies force to the inner tapered surface 72 of the shoe or tire 70, causing radially outward movement thereof. Due to the construction and arrangement of the parts, substantially uniform radial expansion of the shoe or tire 70 is obtained, with the result that the length of its peripheral surface 42, and thus the effective size of the wheel 40, can be substantially increased without objectionably changing its circular shape.

Since in the arrangement illustrated any shims or washers 80 which are removed from positions between the body 62 and the side plate 76 are inserted on the opposite side in positions between the body 62 and the side plate 74, the spacing between the plates 74 and 76 is the same for each relative lateral position of the plate 76 with respect to the body 62. Since lateral compression of the tire 70 between the plates 74 and 76 is not required to cause radial expansion thereof, the arrangement permits the segmental sections 92 of the shoe or tire 70 to be made of a hard material, such as steel. This hard material provides the peripheral surface 42 of the wheel 40. There is less likelihood that the surface 42 will be worn down due to frictional contact with the line or cable 10 than would be the case if the sections 92 were made of a softer material, such as rubber or the like.

Since the shims or washers 80 may be variously arranged, as hereinbefore described, to control or limit the spacing between the stationary abutment or surface 68 and the movable abutment or surface 90, the wheel 40 may be adjusted to any of a variety of predetermined sizes. If desired, the shims or washers 80 may be selected so that each is of uniform lateral thickness and a calibration chart or guide may be prepared showing the effective wheel sizes which are obtainable using each of a variety of shim-stock arrangements.

While the invention is herein described with reference to a particular embodiment thereof, it is understood that various modifications thereof may be made within the spirit of the invention which is best defined by the scope of the appended claims.

What is claimed is:

1. An adjustable measuring wheel comprising a rigid body, an expansible shoe on said body having an annular peripheral surface for contacting objects to be measured, said shoe including a multiplicity of angularly spaced rigid sections interconnected by a resilient and expansible material in the spaces between said sections, and means for applying force to an inner surface of said shoe to radially expand said shoe and lengthen the annular peripheral surface thereof.

2. An adjustable measuring wheel comprising a rigid circular body having a tapered peripheral surface, a radially expansible annular shoe having an inner surface disposed on said body adjacent the tapered peripheral surface thereof, said shoe including a multiplicity of rigid sections expansibly connected together and having an outer surface for contacting objects to be measured, a side plate mounted adjacent said shoe in spaced facing relation to the tapered peripheral surface of said body, and means including a plurality of removable spacers disposed between said side plate and said body for permitting said shoe to be adjustably moved along the tapered peripheral surface of said body in a direction such as to expand said shoe and lengthen the outer surface thereof.

3. The invention as claimed in claim 2 wherein said shoe includes a multiplicity of angularly spaced rigid sections interconnected by a resilient and expansible material in the spaces between said sections.

4. An adjustable measuring wheel comprising a rigid circular body having a tapered peripheral surface, an expansible annular shoe having a tapered inner surface disposed on said body adjacent the tapered peripheral surface thereof and having an outer peripheral surface for contacting objects to be measured, said shoe including a multiplicity of angularly spaced rigid sections interconnected by a resilient and expansible material substantially filling the spaces between said sections, and means for moving said shoe laterally with respect to said body in a direction such as to radially expand said shoe and thereby lengthen the outer peripheral surface thereof.

5. An adjustable measuring wheel comprising a rigid circular body having a tapered peripheral surface, a resilient and expansible annular shoe encircling the tapered peripheral surface of said body and having an outer peripheral surface for contacting objects to be measured, said shoe including a multiplicity of angularly spaced rigid metal sections interconnected by a resilient and expansible material substantially filling the spaces between said sections, and means for selectively moving said shoe to any of a variety of relative lateral positions with respect to said body to control the radial expansion of said shoe and thereby control the length of the peripheral surface contacting objects to be measured.

6. An adjustable measuring wheel comprising a rigid circular body having a tapered surface extending laterally inward and radially outward thereof, an expansible annular shoe having a tapered inner surface disposed adjacent the tapered surface of said body and having an outer surface for contacting objects to be measured, said shoe including a multiplicity of angularly spaced segmental sections of a hard material and resilient and expansible means disposed in the spaces between and interconnecting said segmental sections, and means for selectively moving said shoe to any of a variety of relative lateral positions with respect to said body to adjust the radial expansion of said shoe and thereby control the effective size of the measuring wheel.

7. An adjustable measuring wheel comprising, a rigid body, annular abutment means on said body, an expansible annular shoe having a tapered inner surface disposed on said body adjacent the annular abutment means thereon, said shoe including a multiplicity of rigid sections expansibly interconnected and having an outer peripheral surface for contacting objects to be measured, and expanding means for adjustably moving said shoe to any of a variety of predetermined relative lateral positions with respect to the abutment means on said body to control the radial expansion of said shoe and thereby control the length of the outer peripheral surface thereof, said expanding means including another abutment means mounted adjacent said shoe in normally spaced relation to the body abutment means and means for adjustably moving one of said abutment means a predetermined distance toward the other whereby force is applied to the tapered inner surface of said shoe so as to cause uniform radial expansion thereof.

References Cited in the file of this patent

UNITED STATES PATENTS

| | | |
|---|---|---|
| 527,472 | Atland et al. | Oct. 16, 1894 |
| 619,874 | Dietrich | Feb. 21, 1899 |
| 2,269,573 | Barry | Jan. 13, 1942 |

FOREIGN PATENTS

| | | |
|---|---|---|
| 613,972 | Germany | May 31, 1935 |